United States Patent
Jang

(10) Patent No.: US 12,118,042 B2
(45) Date of Patent: Oct. 15, 2024

(54) METHOD, SYSTEM, AND NON-TRANSITORY COMPUTER-READABLE RECORD MEDIUM FOR PROVIDING MULTIPLE MODELS OF FEDERATED LEARNING USING PERSONALIZATION

(71) Applicant: LINE Plus Corporation, Seongnam-si (KR)

(72) Inventor: Hyukjae Jang, Seongnam-si (KR)

(73) Assignee: Line Plus Corporation, Seongnam-si (KR)

( * ) Notice: Subject to any disclaimer, the term of this patent is extended or adjusted under 35 U.S.C. 154(b) by 0 days.

(21) Appl. No.: 17/336,769

(22) Filed: Jun. 2, 2021

(65) Prior Publication Data

US 2021/0390152 A1    Dec. 16, 2021

(30) Foreign Application Priority Data

Jun. 11, 2020  (KR) .................. 10-2020-0070774

(51) Int. Cl.
| | |
|---|---|
| *G06F 7/00* | (2006.01) |
| *G06F 16/906* | (2019.01) |
| *G06F 16/9536* | (2019.01) |
| *G06F 18/2431* | (2023.01) |
| *G06N 20/00* | (2019.01) |

(52) U.S. Cl.
CPC ........ *G06F 16/906* (2019.01); *G06F 16/9536* (2019.01); *G06F 18/2431* (2023.01); *G06N 20/00* (2019.01)

(58) Field of Classification Search
CPC ... G06F 16/9536; G06F 16/906; G06K 9/628; G06N 20/00; G06N 3/0454; G06N 3/08; G06N 20/20; G06N 3/04
See application file for complete search history.

(56) References Cited

U.S. PATENT DOCUMENTS

| | | | |
|---|---|---|---|
| 2006/0004622 A1* | 1/2006 | Fanelli | G06Q 30/0203 705/7.33 |
| 2010/0023475 A1* | 1/2010 | Lahav | G06Q 30/0251 706/59 |
| 2011/0125700 A1* | 5/2011 | Funada | G06F 11/3447 706/50 |
| 2012/0290521 A1* | 11/2012 | Frank | G06N 20/00 706/45 |
| 2013/0103624 A1* | 4/2013 | Thieberger | G06K 9/6256 706/12 |

(Continued)

FOREIGN PATENT DOCUMENTS

| | | |
|---|---|---|
| KR | 10-2018-0002122 A | 1/2018 |
| KR | 10-2019-0117837 A | 10/2019 |

OTHER PUBLICATIONS

Korean Office Action issued Apr. 26, 2022 in Korean application No. 10-2020-0070774.

*Primary Examiner* — Mohammed R Uddin
(74) *Attorney, Agent, or Firm* — Harness, Dickey & Pierce, P.L.C.

(57) ABSTRACT

Disclosed is a method, system, and non-transitory computer-readable record medium for providing a multi-model through federated learning using personalization. The method includes classifying users into a plurality of groups; and generating a prediction model for a service as a multi-model through federated learning for each of the plurality of groups.

15 Claims, 11 Drawing Sheets

(56) References Cited

U.S. PATENT DOCUMENTS

| | | | |
|---|---|---|---|
| 2013/0262216 A1* | 10/2013 | Zhang | G06Q 30/02 |
| | | | 703/2 |
| 2015/0170053 A1* | 6/2015 | Miao | G06N 20/00 |
| | | | 706/12 |
| 2015/0278837 A1* | 10/2015 | Lahav | G06Q 30/0204 |
| | | | 705/7.33 |
| 2016/0086094 A1* | 3/2016 | Tsubouchi | G06N 5/025 |
| | | | 706/52 |
| 2017/0061286 A1* | 3/2017 | Kumar | G06Q 30/0269 |
| 2018/0032883 A1* | 2/2018 | Sullivan | G06N 5/04 |
| 2018/0225581 A1* | 8/2018 | Oyamada | G06N 7/005 |
| 2018/0268283 A1* | 9/2018 | Gilad-Bachrach | G06N 5/003 |
| 2019/0147360 A1 | 5/2019 | Matsumoto et al. | |
| 2019/0171978 A1* | 6/2019 | Bonawitz | G06F 16/95 |
| 2019/0385043 A1* | 12/2019 | Choudhary | G06N 3/084 |
| 2020/0005071 A1* | 1/2020 | Kim | G06N 3/0454 |
| 2020/0027019 A1* | 1/2020 | Yang | G06Q 20/326 |
| 2020/0065509 A1* | 2/2020 | Ojha | H04L 63/1466 |
| 2020/0174433 A1* | 6/2020 | Hughes | G06T 11/206 |
| 2020/0218937 A1* | 7/2020 | Visentini Scarzanella | |
| | | | G06N 3/0454 |
| 2020/0244639 A1* | 7/2020 | Arif Khan | G06N 3/08 |
| 2020/0285891 A1* | 9/2020 | Yellin | H04L 67/34 |
| 2021/0117780 A1* | 4/2021 | Malik | G06F 16/3329 |
| 2021/0150269 A1* | 5/2021 | Choudhury | G06K 9/6247 |
| 2021/0166157 A1* | 6/2021 | Bhowmick | G06N 20/20 |
| 2021/0241314 A1* | 8/2021 | Yan | G06Q 30/0254 |
| 2021/0256429 A1* | 8/2021 | Gilbertson | G06N 20/00 |

* cited by examiner

METHOD, SYSTEM, AND NON-TRANSITORY COMPUTER-READABLE RECORD MEDIUM FOR PROVIDING MULTIPLE MODELS OF FEDERATED LEARNING USING PERSONALIZATION

CROSS-REFERENCE TO RELATED APPLICATION(S)

This U.S. non-provisional application and claims the benefit of priority under 35 U.S.C. § 365(c) to Korean Patent Application No. 10-2020-0070774, filed Jun. 11, 2020, the entire contents of which are incorporated herein by reference in their entirety.

TECHNICAL FIELD

One or more example embodiments relate to technology for generating a prediction model for providing a service through federated learning.

RELATED ART

Deep learning refers to technology used to cluster and/or classify objects and/or data and is currently used for various technology fields in that deep learning enables inference according to classification through a neural network in a multilayered form.

In an existing deep learning structure, a server trains a prediction model for providing a service as a single model to be commonly used by all users based on large-scale cloud data.

SUMMARY

Example embodiments may generate a prediction model for providing a service as a multi-model through federated learning using personalization.

Example embodiments may classify users into a plurality of groups and generate a multi-model through federated learning for a plurality of user groups.

Example embodiments may generate an optimal learning model through personalization in a group for each user group.

Example embodiments may generate a personalized learning model while maintaining personal privacy protection through federated learning.

Example embodiments may use a model trained through a similar user group without participation into federated learning.

According to an aspect of at least one example embodiment, there is provided a method performed by a computer system including at least one processor configured to execute computer-readable instructions included in a memory, the method including classifying, by the at least one processor, users into a plurality of groups; and generating a prediction model for a service as a multi-model through federated learning for each of the plurality of groups.

The classifying may include grouping the users based on at least one piece of information collectable by the computer system in association with the service.

The classifying may include grouping the users based on at least one of a user profile and domain knowledge of the service.

The classifying may include grouping the users based on collaborative filtering.

The method may further include generating an initial model, distributing the initial model generated by the computer system to electronic devices of the users. The generating of the prediction model for the service may include generating, for each of the plurality of groups, a corresponding group model by collecting, into a single model of the multi-model, models trained by the electronic devices of the users belonging to a corresponding group.

The generating of the prediction model for the service may include distributing the corresponding group model to the electronic devices of the users belonging to the corresponding group; and improving the corresponding group model by receiving update data about the corresponding group model from the electronic devices of the users belonging to the corresponding group.

The service may be a content recommendation service, and the generating of the prediction model for the service may include generating a content recommendation model for each of the plurality of groups as a learning result model using in-device data related to content in an electronic device of each of the users belonging to a corresponding group through the federated learning for each group of the plurality of groups.

The classifying may include grouping the users based on at least one piece of information collectable by the computer system in association with the content recommendation service.

The classifying may include classifying at least one corresponding user into at least two groups to which the at least one corresponding user belongs.

The generating of the prediction model for the service may include distributing at least two corresponding group models to an electronic device of the at least one corresponding user based on the groups to which the at least one corresponding user belongs; and improving the corresponding group models based on update data about the corresponding group models received from the electronic device.

According to an aspect of at least one example embodiment, there is provided a non-transitory computer-readable record medium storing instructions that, when executed by a processor, cause the processor to perform the method.

According to an aspect of at least one example embodiment, there is provided a computer system including at least one processor configured to execute computer-readable instructions included in a memory. The at least one processor may be configured to classify users into a plurality of groups; and generate a prediction model for a service as a multi-model through federated learning for each of the plurality of groups and to provide the generated prediction model.

Further areas of applicability will become apparent from the description provided herein. The description and specific examples in this summary are intended for purposes of illustration only and are not intended to limit the scope of the present disclosure.

DETAILED DESCRIPTION

Figure 1:
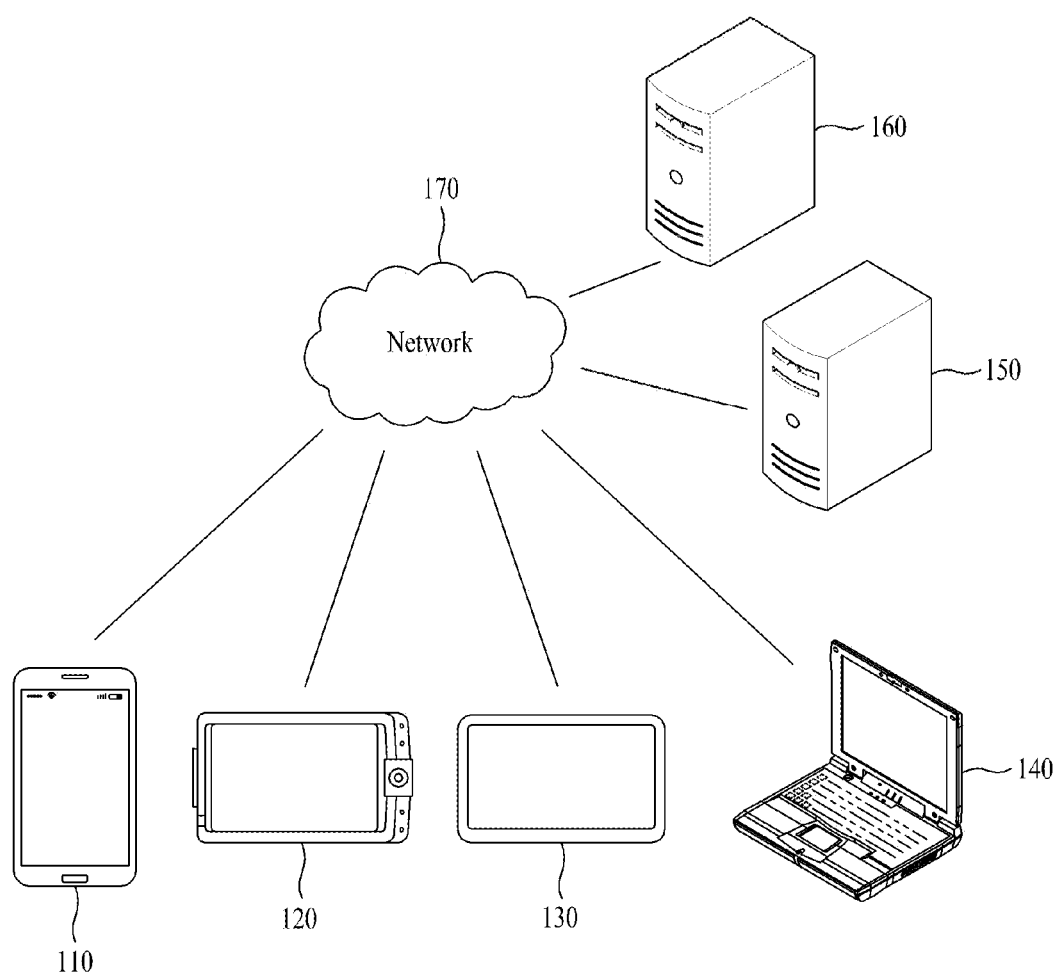
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and/or techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to technology for generating a prediction model for providing a service through federated learning.

The example embodiments including the disclosures described herein may generate a prediction model for providing a service through federated learning using personalization as a multi-model and may provide the generated prediction model.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices and/or a number of servers are not limited thereto.

Each of the plurality of electronic devices 110, 120, 130, and 140 may be a fixed terminal or a mobile terminal that is configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and/or the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless and/or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and/or Internet. Also, the network 170 may include at least one of network topologies that include a bus network, a star network, a ring network, a mesh network, a star-bus network, a tree or hierarchical network, and/or the like. However, the topologies are provided as examples only, and the network 170 is not limited thereto.

Each of the servers 150 and 160 may be configured as a computer apparatus and/or a plurality of computer apparatuses that provides an instruction, a code, a file, content, a service, etc., through communication with the plurality of electronic devices 110, 120, 130, and/or 140 over the network 170. For example, the server 150 may be a system that provides a first service to the plurality of electronic devices 110, 120, 130, and/or 140 connected over the network 170. The server 160 may be a system that provides a second service to the plurality of electronic devices 110, 120, 130, and/or 140 connected over the network 170. For example, the server 150 may provide, as the first service, a service (e.g., a content recommendation service) through an application as a computer program installed and/or executed on the plurality of electronic devices 110, 120, 130, and/or 140. As another example, the server 160 may provide, as the second service, a service that distributes a file for installing and/or executing the application to the plurality of electronic devices 110, 120, 130, and/or 140.

Figure 2:
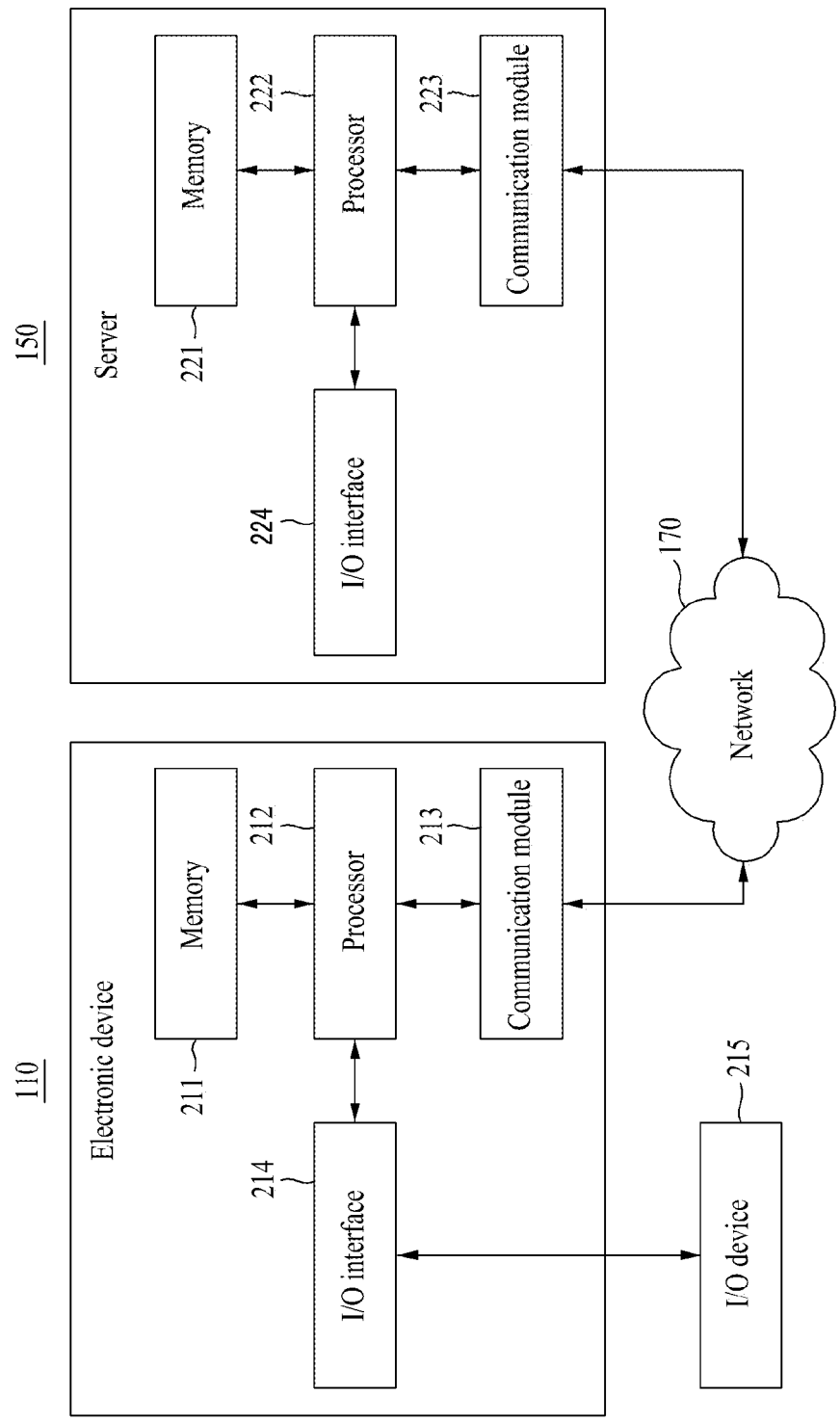
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and/or 140 or the server 160 may have the same or similar configuration as that of the electronic device 110 or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include volatile and/or non-volatile memory. For example, the non-volatile memory may include a permanent mass storage device, such as random access memory (RAM), a read only memory (ROM), a disk drive, a solid state drive (SSD), a flash memory, etc., as a non-transitory computer-readable record medium. However, in at least one example embodiment, the permanent mass storage device, such as ROM, SSD, flash memory, and disk drive, may be included in the electronic device 110 and/or the server 150 as a permanent storage device separate from the memory 211, 221. Also, an OS and at least one program code, for example, a code for a browser installed and executed on the electronic device 110 or an application installed and executed on the electronic device 110 (e.g., to provide a specific service) may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 and another electronic device, for example, the electronic device 120 or another server (for example the server 160). For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110. The communication module 213, 223 may, for example, include processors, a bus, an antenna, a connection port, and/or the like.

The I/O interface 214 may be a device used for interface with an input and/or output (I/O) apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 and/or included in the server 150. For example, when the processor 212 of the electronic device 110 processes an instruction of a computer program loaded to the memory 211, a content, and/or a service screen configured based on data provided from the server 150 or the electronic device 120 may be displayed on the display through the I/O interface 214.

According to other example embodiments, the electronic device 110 and the server 150 may include a number of components greater than or less than a number of components shown in FIG. 2. However, there is no need to clearly illustrate many components according to the related art. For example, the electronic device 110 may include at least a portion of the I/O apparatus 215, or may further include other components, for example, a transceiver, a global positioning system (GPS) module, a camera, a variety of sensors, a database (DB), and the like. For example, if the electronic device 110 is a smartphone, the electronic device

110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, example embodiments of a method and system for providing a multi-model through federated learning using personalization are described.

Figure 3:
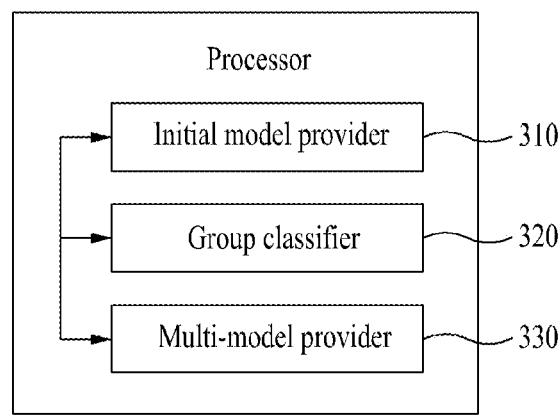
FIG. 3 is a diagram illustrating an example of components includable in a processor of a server according to at least one example embodiment.
Figure 4:
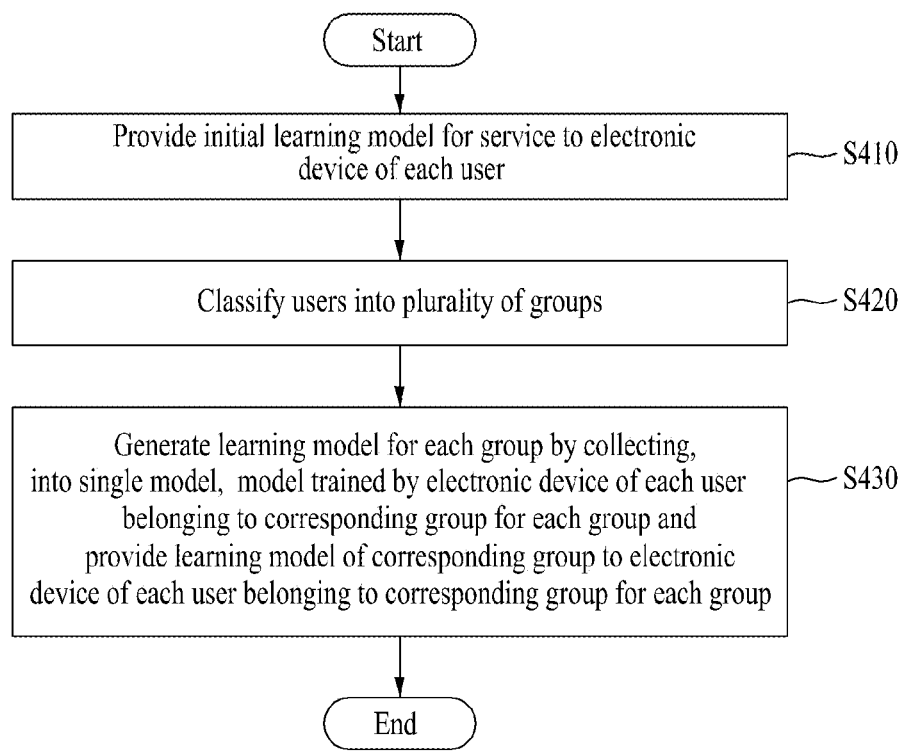
FIG. 4 is a flowchart illustrating an example of a method performed by a server according to at least one example embodiment.

FIG. 3 is a diagram illustrating an example of components includable in a processor of an electronic device according to at least one example embodiment, and FIG. 4 is a flowchart illustrating an example of a method performed by a server according to at least one example embodiment.

The server 150 according to the example embodiment serves to generate a prediction model required to provide a service and to distribute the prediction model to users using the service. A model providing system implemented as a computer may be configured in the server 150. The server 150 is for the plurality of electronic devices 110, 120, 130, and 140 that are clients and may distribute the prediction model through connection to an exclusive application installed on the electronic devices 110, 120, 130, and 140 or to a web/mobile site associated with the server 150. The server 150 may train the prediction model based on federated learning with a client, and more particularly, may generate the prediction model for providing a service as a multi-model based on federated learning in which personalization factors of the client are applied and may provide the generated prediction model.

Referring to FIG. 3, to perform the method of FIG. 4, the processor 222 of the server 150 may include an initial model provider 310, a group classifier 320, and a multi-model provider 330. Depending on example embodiments, the components of the processor 222 may be selectively included in or excluded from the processor 222. Also, depending on example embodiments, the components of the processor 222 may be separated or merged for representations of functions of the processor 222.

The processor 222 and the components of the processor 222 may control the server 150 to perform operations S410 to S430 included in the method of FIG. 4. For example, the processor 222 and the components of the processor 222 may be configured to execute an instruction according to a code of at least one program and a code of an OS included in the memory 221.

Here, the components of the processor 222 may be representations of different functions performed by the processor 222 in response to an instruction provided from the program code stored in the server 150. For example, the initial model provider 310 may be used as a functional representation of the processor 222 that controls the server 150 to provide an initial learning model as a prediction model for a service in response to the instruction.

The processor 222 may read a necessary instruction from the memory 221 to which instructions associated with control of the server 150 are loaded. In this case, the read instruction may include an instruction for controlling the processor 222 to perform the following operations S410 to S430. The following operations S410 to S430 may be performed in order different from order illustrated in FIG. 4 and a portion of operations S410 to S430 may be omitted. Alternatively, an additional process may be further included.

Referring to FIG. 4, in operation S410, the initial model provider 310 may provide an initial model generated as a prediction model required to provide a service to an electronic device of each user. An initial learning model may represent a single model that is generated by the server 150 as the first learning model based on data of a cloud. The initial model provider 310 may generate the initial learning model for the service and may distribute the initial learning model to electronic devices of some users selected for federated learning. Each electronic device may download the initial learning model from the server 150 and may initially train the initial learning model based on in-device data. For example, each electronic device may improve learning of the initial learning model using device data according to a device use of a user.

In operation S420, the group classifier 320 may classify the users selected for federated learning into a plurality of groups. For example, the group classifier 320 may group the users based on a user profile, for example, an age and/or age range, a gender, and/or a region. As another example, the group classifier 320 may group users based on domain knowledge of the service the server 150 is configured to provide. The domain knowledge may represent history information acquirable through a service domain and may include, for example, content or product purchase history, inquiry history, and app installation history. The group classifier 320 may use information collectable by the server 150 in association with the service as a standard used to perform user grouping. Here, the group classifier 320 may apply a different user group classification criterion based on the service domain.

In operation S430, the multi-model provider 330 may generate a multi-model based on federated learning to which personalization factors of users belonging to a corresponding group are applied for each group, with respect to a plurality of groups, and may distribute the generated multi-model as a final learning model for the entire users.

To this end, the multi-model provider 330 may collect, into a single model (hereinafter, a group model), a model trained by an electronic device of each user belonging to a corresponding group. For example, when some users selected for federated learning are classified into N groups (N representing an integer), a group model for each group may be generated by collecting individual learning result models into a single model. Therefore, N group models may be generated.

When a group model for each group is generated, the multi-model provider 330 may provide a group model of a corresponding group to an electronic device of each user belonging to a corresponding group. The multi-model provider 330 may distribute a group model corresponding to each group with respect to N user groups. An electronic device of each group may download a corresponding group model from the server 150 and may individually train the group model based on in-device data. For example, each electronic device may improve learning of a group model based on device data according to device use of a user. The multi-model provider 330 may generate N learning result models through federated learning for each group with respect to the N user groups.

The multi-model provider 330 may perform the aforementioned federated learning process for each group at least once repeatedly and then distribute a corresponding group model to each of all the service users. The multi-model provider 330 may also group users that do not participate in federated learning based on the same criterion as that used for users that participate in federated learning and may use a learning model of a group to which a corresponding user belongs when providing the service.

Figure 5:
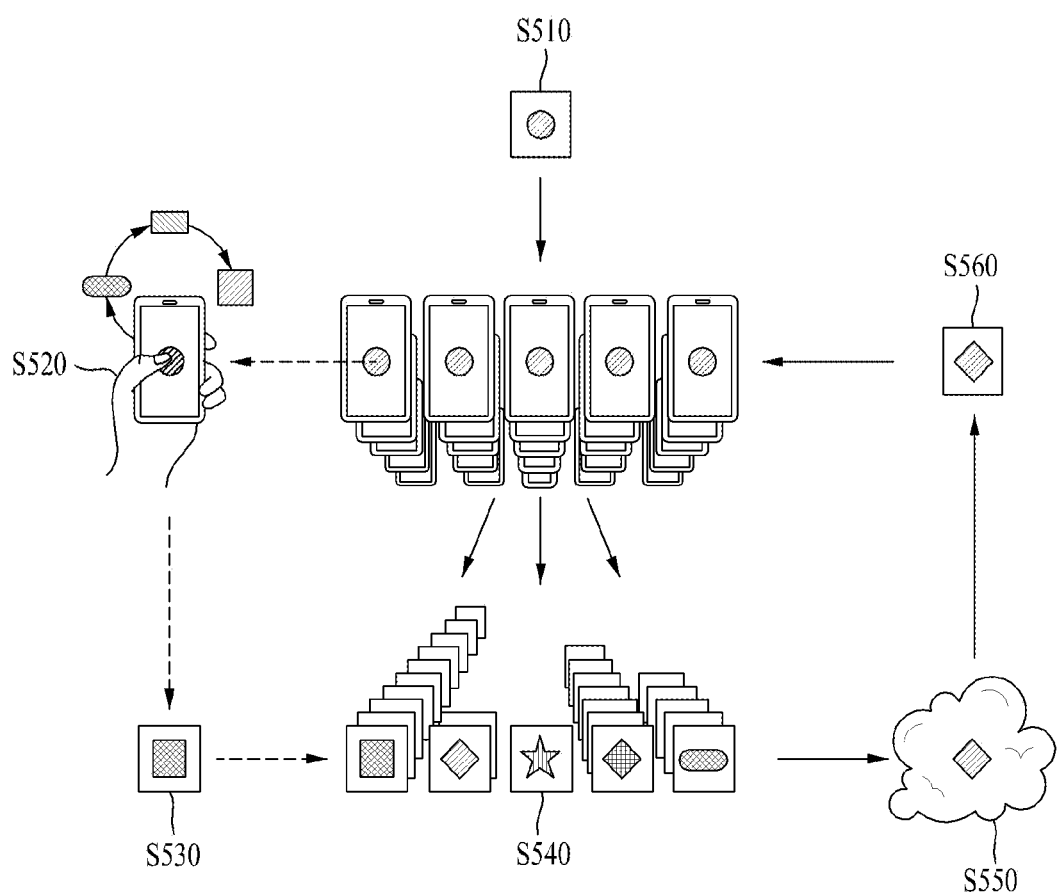
FIGS. 5 to 7 illustrate examples of federated learning technology according to at least one example embodiment.
Figure 6:
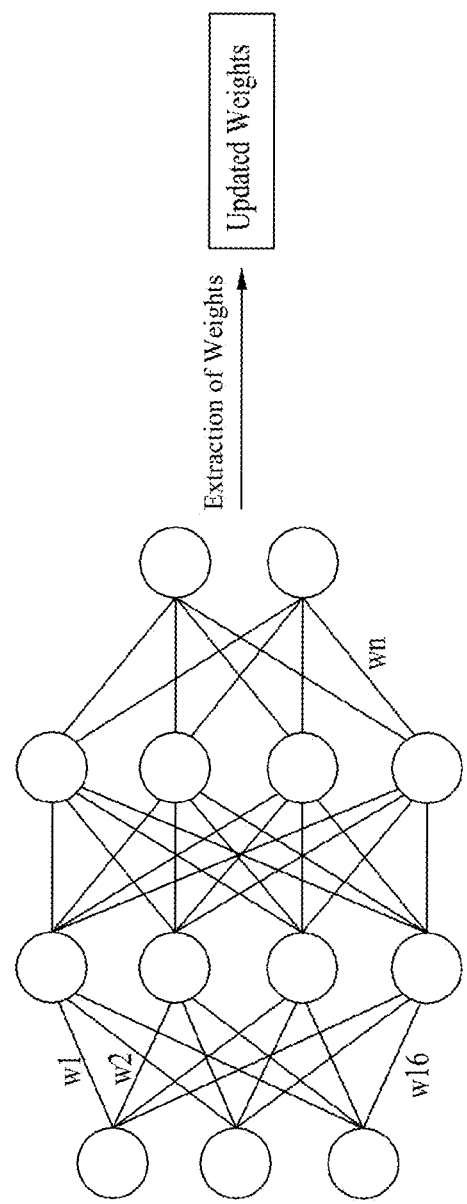
Figure 7:
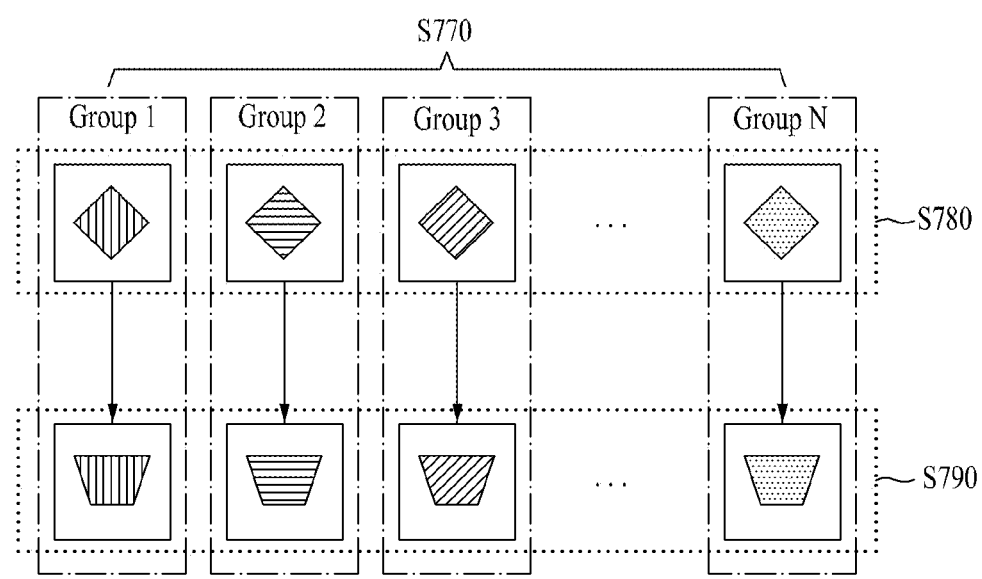

FIGS. 5 to 7 illustrate examples of federated learning technology according to at least one example embodiment.

In the case of applying federated learning, an individual device may directly manage data, may commonly train a model, and thus, may have no need to store the data in the server 150 or a separate server, for example, the server 160. Accordingly, personal privacy protection may be guaranteed.

Referring to FIG. 5, in operation S510, all the electronic devices selected for federated learning may download a prediction model corresponding to an initial model. In operation 520, each electronic device may improve learning of the prediction model based on in-device data according to a device use of a user. In operation S530, each electronic device may improve learning of the prediction model and may generate modifications according to the improvement as update data. In operation S540, prediction models of all the electronic devices may be trained by applying a different use environment and user characteristic for each device. In operation S550, update data of each electronic device may be transmitted to the server 150 and may be used to improve the prediction model. In operation S560, the improved prediction model may be distributed again to each corresponding electronic device. Each electronic device may develop the prediction model by repeating a process of retraining and improving the redistributed prediction model and may share the developed prediction model.

A service based on such federated learning may have the following improvements over other large-scale cloud data based prediction models. Since the server 150 does not collect user data for model training, personal information may not be leaked. For example, instead of transmitting personal raw data to the server 150, weights that are update data may be collected from the plurality of electronic devices 110, 120, 130, and/or 140, which may prevent and/or mitigate the leakage of personal information. Additionally, instead of using data collected in an arbitrary environment, actual data used by a user in an electronic device may be used for model training. Also, since model training individually occurs in a device of each user, a separate server for learning is not required.

FIG. 6 illustrates an example of a weight that represents update data in a federated learning process according to at least one example embodiment. The term "weight" represents a set of variables that may be learned using a neural network of deep learning. Update data in each electronic device 110, 120, 130, and/or 140 to improve a prediction model may be generated in a form of a weight. A weight generated through a prediction model of each electronic device may be represented as, for example, W=[w1, w2, . . . , wn]. The weight may be uploaded to the server 150 and may be used to improve the prediction model.

FIG. 7 illustrates an example of a process of generating a multi-model through federated learning according to at least one example embodiment.

Referring to FIG. 7, in operation S770, the server 150 may classify users selected for federated learning into N groups based on at least one of profile information and information collected in association with a service.

A model trained by each electronic device of a corresponding group through operation S520 of FIG. 5 may be collected into a single model (e.g., a group model). Since a single group model is generated for each group, N group models may be generated as learning models for the respective groups in operation S780.

In operation S790, a group model of each group may be redistributed to an electronic device of each user that belongs to a corresponding group and each electronic device may retrain the group model based on device data and may improve learning of the group model. Update data that represents modifications according to improvement of learning in each device for a group model may be transmitted to the server 150 and used to improve a corresponding group model.

Therefore, according to the example embodiment, a prediction model required to provide a service may be generated as a multi-model personalized based on a group characteristic through federated learning for each group. Therefore, since each group model is trained based on actual data of users in the group, unintended dilution and/or over generalization may be mitigated and/or prevented in the training of each group model.

Figure 8:
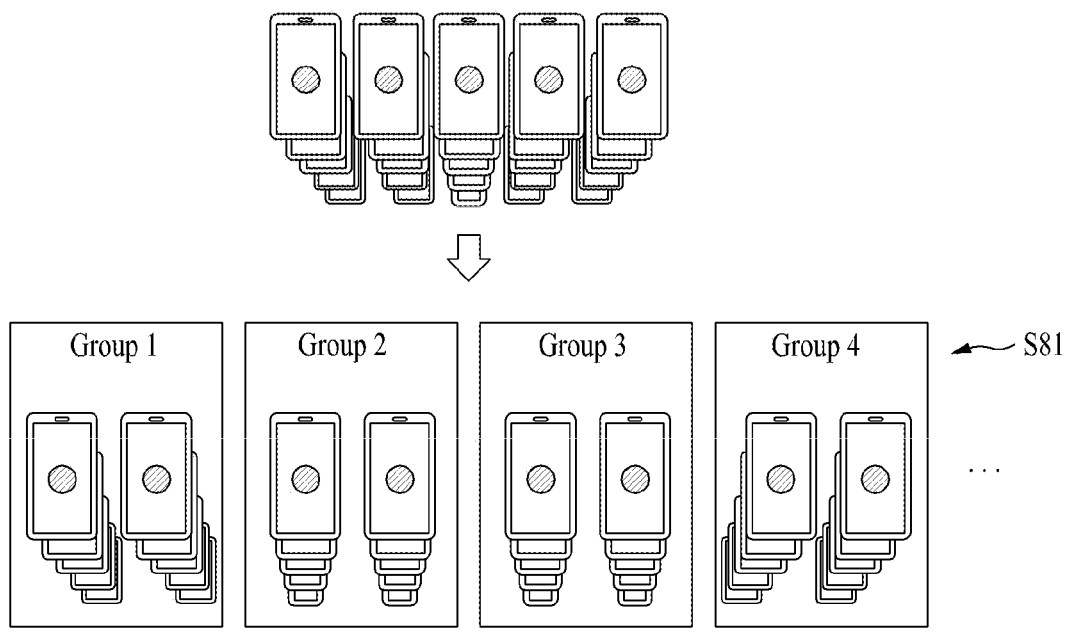
FIGS. 8 to 10 illustrate examples of a process of generating a multi-model for a content recommendation service according to at least one example embodiment.
Figure 9:
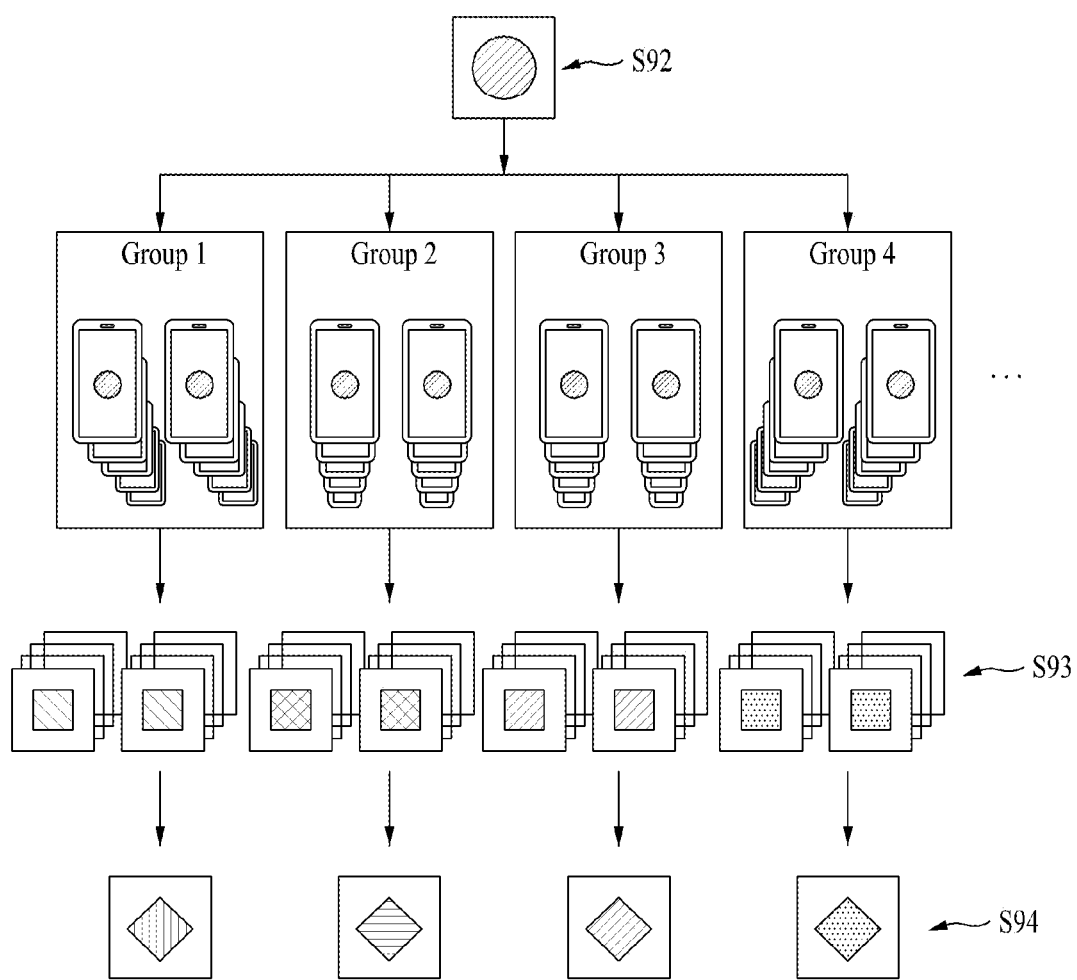
Figure 10:
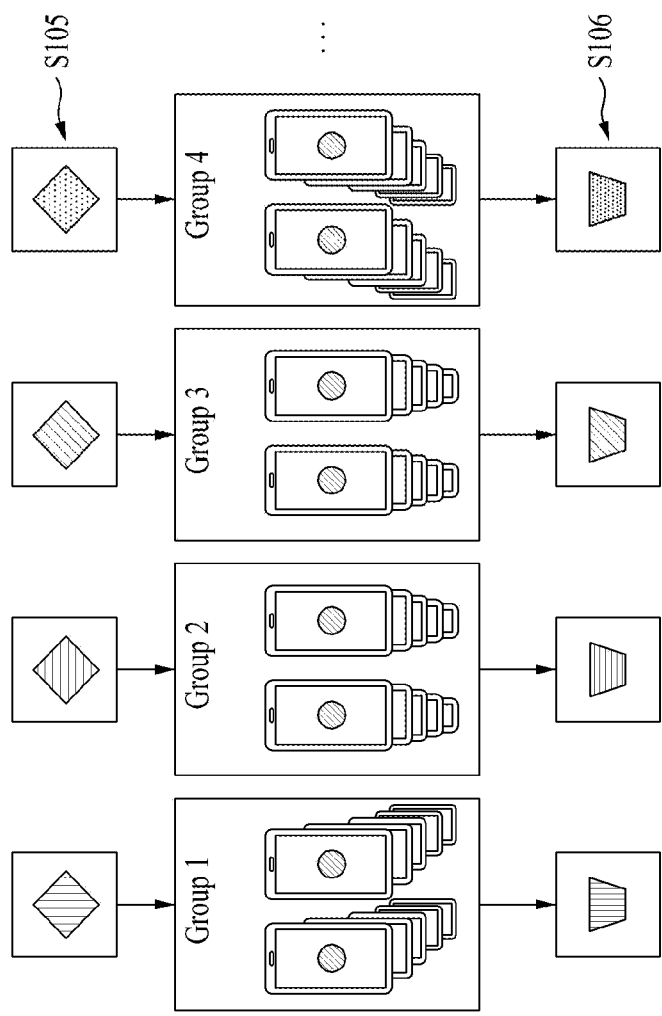

FIGS. 8 to 10 illustrate examples of a process of generating a multi-model for a content recommendation service according to at least one example embodiment.

When a service that the server 150 is configured to provide is a service that automatically recommends content, a content recommendation model may be trained based on user data related to content through federated learning for each group.

Herein, the term "content" may include all targets recommendable as service content, such as, for example, a sticker, an advertisement (a product, an app, etc.), a video, an image, and various types of documents.

Referring to FIG. 8, in operation S81, the group classifier 320 may classify all users selected for federated learning into a plurality of groups.

When a service that the server 150 desires to provide is a sticker recommendation service, the group classifier 320 may perform a user group classification based on information collectable by the server 150 in association with a sticker. For example, the group classifier 320 may classify users into user groups based on a personal sticker purchase history, a sticker available through actual downloading among stickers purchased by a user, and/or a sticker actually used by a user in the user group during a preset (or otherwise determined) period of time. For example, the group classifier 320 may classify users into a user group A of users having used a sticker including a character "Brown" a preset (or otherwise determined) number of times or more and into a user group B of users having used a sticker including a character "Moon" a preset (or otherwise determined) number of times or more within the last 24 hours.

When a service that the server 150 desires to provide is an advertisement recommendation service, the group classifier 320 may perform user group classification based on information collectable by the server 150 in association with advertising content. For example, the group classifier 320 may classify users into user groups based on a personal product purchase history, a product of which contents are searched for by a user during a recent preset (or otherwise determined) period of time, and/or a keyword input from a user to search for a product during a recent period of time. As another example, the group classifier 320 may classify users into user groups based on an application history installed by a user, an application actually used by a user during a recent preset period of time, and/or the like.

The group classifier 320 may use a collaborative filtering algorithm in performing user group classification. The collaborative filtering refers to a method of automatically predicting interest of a corresponding user based on preference information acquired from many users and may also refer to a method of identifying users having similar patterns in preference and interest based on preferences and expressions of interests of users. The collaborative filtering may include a method of retrieving a user having a similar pattern to those of existing users predictable to some extent and quantifying and using a behavior of the user, a method of determining an item matrix for determining a correlation between items and inferring preference of a corresponding user based on recent user data, and a method based on implicit observation about behaviors of users. Users selected for federated learning may be classified into a plurality of groups based on the above collaborate filtering.

In addition to the collaborative filtering, users may be classified into user groups using a known clustering algorithm and/or machine learning algorithm.

Referring to FIG. 9, in operation S92, the initial model provider 310 may distribute a content recommendation model generated as an initial model by the server 150 to each of electronic devices of all users selected for federated learning. Each electronic device may download the content recommendation model from the server 150 and may individually train the content recommendation model based on data present only in a device.

When the content recommendation model is a model for automatically recommending a sticker, a recommendation model may be trained based on a sticker use history that is based on a user conversation as an example of data present only in each electronic device. For example, a model may be trained by recommending a sticker based on a use history of a user as a response recommended by a smart reply model. For example, a different sticker having a different sticker ID may be recommended to users belonging to a user group A and to users belonging to a user group B as a response to a message "good morning," and each of a model of the user group A and a model of the user group B may be trained based on a response selected or transmitted from an actual corresponding user in response to the recommendation.

When the content recommendation model is a model for automatically recommending an advertisement, a recommendation model may be trained based on a recent product and/or app purchase history of a user as an example of data present only in each electronic device. For example, a model may be trained by recommending a product ID and/or an app ID based on a purchase history of a user as a response recommended by the smart replay model.

In operation S93, the multi-model provider 330 may collect a model trained in an electronic device of each user belonging to a corresponding group for each group. In operation S94, the multi-model provider 330 may generate the collected models into a single group model. The multi-model provider 330 may generate the content recommendation model as a multi-model trained for each group using the user group.

Referring to FIG. 10, when a model for each group is generated as a multi-model for the content recommendation model, the multi-model provider 330 may redistribute a corresponding group model to an electronic device of each user belonging to a corresponding group. Each electronic device may improve learning of the group model based on user data.

In operation S106, the multi-model provider 330 may receive update data that represents modifications according to learning improvement about the group model from each corresponding electronic device and may use the update data to improve the corresponding group model.

The multi-model provider 330 may generate the content recommendation model as a multi-model based on the user group and may develop and share the content recommendation model generated for each group through federated learning of each group.

According to some example embodiments, by training a recommendation model based on personalized data according to a group characteristic for each group rather than training a recommendation model for all the contents, it is possible to improve a content recommendation accuracy.

Although it is described that a single user trains a single group model, it is provided as an example only. A single user may train at least two group models and may perform federated learning through multiple personalization.

For example, since a style or a sticker used by a user may vary depending on a person with whom the user is talking, the user may be classified into not a single group but at least two groups. Data used to train a model may be analyzed and classified in advance. Each of M (<N) group models in a device may be trained using corresponding data.

Figure 11:
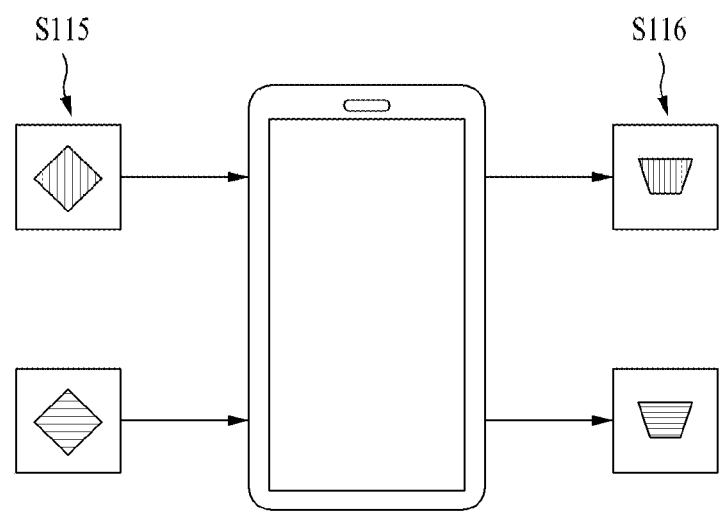
FIG. 11 illustrates an example of a model training process using multiple personalization according to at least one example embodiment.

Referring to FIG. 11, in operation S115, the multi-model provider 330 may distribute, to an electronic device of each user, a group model corresponding to M groups to which a corresponding user belongs. The multi-model provider 330 may train each of M group models based on data corresponding to each model in the electronic device. For example, when a user has a sticker purchase history of type A and a sticker purchase history of type B, an electronic device of the corresponding user may download a sticker recommendation model of type A and a sticker recommendation model of type B based on the sticker purchase history of type A and the sticker purchase history of type B. For example, even the same user may use a different type of a sticker for each chatroom. Therefore, the multi-model provider 330 may classify chatrooms into a chatroom of type A and a chatroom of type B based on conversation contents and a sticker classification model and may train each of the sticker recommendation model of type A and the sticker recommendation model of type B as a separate model based on an actual sticker use history in each chatroom.

In operation S116, the multi-model provider 330 may receive update data for each model from an electronic device with respect to M group models and may use the update data to improve a corresponding model. When collecting group models, the multi-model provider 330 may separately collect M models distributed to an electronic device of a single user for each group.

According to some example embodiments, it is possible to provide a service suitable for a personal characteristic by using a multi-model to which a plurality of characteristics of a user is applied based on federated learning through multiple personalization.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, and/or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, and/or some combination thereof, for independently and/or collectively instructing and/or configuring the processing device to operate as desired. Software and/or data may be embodied permanently or temporarily in any type of machine, component, physical equipment, virtual equipment, computer storage medium and/or device, and/or in a propagated signal wave capable of providing instructions or data to and/or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A method performed by a computer system comprising at least one processor configured to execute computer-readable instructions comprised in a memory, the method comprising:
by the at least one processor,
distributing an initial model generated by the computer system to electronic devices of users;
classifying the users into a plurality of groups, at least one first user among the users being classified into at least two groups such that the first user belongs to all of the two groups; and
generating a prediction model for a service as a multi-model through federated learning for each of the plurality of groups,
wherein the generating of the prediction model for the service comprises
generating a corresponding group model, for each of the plurality of groups, by collecting, into a single model of the multi-model, models trained by the electronic devices of the users belonging to a corresponding group through the federated learning,
distributing the corresponding group model to the electronic devices of the users belonging to the corresponding group, each of at least two corresponding group models corresponding to the two groups being distributed to an electronic device of the first user, the at least two corresponding group models including a first group model related to a first chatroom where the first user participates and a second group model related to a second chatroom where the first user participates, the first group model being trained based on data associated with the first chatroom in the electronic device of the first user and first update data associated with the first chatroom for the first group model being received from the electronic device of the first user, and the second group model trained being based on data associated with the second chatroom in the electronic device of the first user and second update data associated with the second chatroom for the second group model being received from the electronic device of the first user, and
improving the corresponding group model based on the update data about the corresponding group model received from the electronic devices of the users belonging to the corresponding group,
wherein the first group model is improved based on a first update data set of the update data including the first update data and the second group model is improved based on a second update data set of the update data including the second update data.

2. The method of claim 1, wherein the classifying of the users comprises grouping the users based on at least one piece of information collectable by the computer system in association with the service.

3. The method of claim 1, wherein the classifying of the users comprises grouping the users based on at least one of a user profile or domain knowledge of the service.

4. The method of claim 1, wherein the classifying of the users comprises grouping the users based on collaborative filtering.

5. The method of claim 1, wherein
the service is a content recommendation service, and
the generating of the prediction model for the service comprises generating a content recommendation model for each of the plurality of groups as a learning result model using in-device data related to content in an electronic device of each of the users belonging to a corresponding group through the federated learning for each group of the plurality of groups.

6. The method of claim 5, wherein the classifying of the users comprises grouping the users based on at least one piece of information collectable by the computer system in association with the content recommendation service.

7. The method of claim 1, wherein the federated learning includes learning the multi-model of the prediction model based on a plurality of the single model.

8. The method of claim 1, wherein the method further comprises:
by the at least one processor, providing the improved corresponding group model to the users belonging to the corresponding group in association with a provision of the service for the users belonging to the corresponding group, classifying at least one of other users not participating in the federated learning into the corresponding group, and providing the improved corresponding group model to the at least one of other users belonging to the corresponding group in association with a provision of the service for the at least one of other users belonging to the corresponding group.

9. A non-transitory computer-readable record medium storing instructions that, when executed by a processor, cause the processor to perform the method of claim 1.

10. A computer system comprising:

at least one processor configured to execute computer-readable instructions comprised in a memory, wherein the at least one processor is configured to provide an initial model generated by the computer system to electronic devices of users;

classify the users into a plurality of groups, at least one first user among the users being classified into at least two groups such that the first user belongs to all of the two groups; and generate a prediction model for a service as a multi-model through federated learning for each of the plurality of groups and to provide the generated prediction model, wherein, for generating the prediction model, the at least one processor is configured to generate a corresponding group model, for each of the plurality of groups, by collecting, into a single model of the multi-model, models trained by the electronic devices of the users belonging to a corresponding group through the federated learning, distribute the corresponding group model to the electronic devices of the users belonging to the corresponding group, each of at least two corresponding group models corresponding to the two groups being distributed to an electronic device of the first user and said each of the two corresponding group models being individually trained based on data corresponding to a respective group model of the two corresponding group models in the electronic device of the first user to generate update data about said each of the two corresponding group models, the at least two corresponding group models including a first group model related to a first chatroom where the first user participates and a second group model related to a second chatroom where the first user participates, the first group model being trained based on data associated with the first chatroom in the electronic device of the first user and first update data associated with the first chatroom for the first group model being received from the electronic device of the first user, and the second group model being trained based on data associated with the second chatroom in the electronic device of the first user and second update data associated with the second chatroom for the second group model being received from the electronic device of the first user and improve the corresponding group model based on update data about the corresponding group model received from the electronic devices of the users belonging to the corresponding group, wherein the first group model is improved based on a first update data set of the update data including the first update data and the second group model is improved based on a second update data set of the update data including the second update data.

11. The computer system of claim 10, wherein the at least one processor is configured to group the users based on at least one piece of information collectable by the computer system in association with the service.

12. The computer system of claim 10, wherein the at least one processor is configured to group the users based on at least one of a user profile or domain knowledge of the service.

13. The computer system of claim 10, wherein the service is a content recommendation service, and the at least one processor is configured to generate a content recommendation model for each of the plurality of groups as a learning result model using in-device data related to the content in an electronic device of each user belonging to a corresponding group through federated learning for each of the plurality of groups.

14. The computer system of claim 13, wherein the at least one processor is configured to group the users based on at least one piece of information collectable by the computer system in association with the content recommendation service.

15. The computer system of claim 10, the at least one processor is further configured to provide the improved corresponding group model to the users belonging to the corresponding group in association with a provision of the service for the users belonging to the corresponding group, classify at least one of other users not participating in the federated learning into the corresponding group, and provide the improved corresponding group model to the at least one of other users belonging to the corresponding group in association with a provision of the service for the at least one of other users belonging to the corresponding group.

* * * * *